(12) United States Patent
Moriya et al.

(10) Patent No.: US 8,631,778 B2
(45) Date of Patent: Jan. 21, 2014

(54) CONTROL DEVICE AND CONTROL METHOD OF A STARTER, AND ENGINE STARTING DEVICE

(75) Inventors: Kouki Moriya, Aichi-gun (JP); Jumpei Kakehi, Toyota (JP); Hasrul Sany Bin Hashim, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/512,990

(22) PCT Filed: Jul. 16, 2010

(86) PCT No.: PCT/JP2010/062089
§ 371 (c)(1),
(2), (4) Date: May 31, 2012

(87) PCT Pub. No.: WO2012/008049
PCT Pub. Date: Jan. 19, 2012

(65) Prior Publication Data
US 2013/0104830 A1    May 2, 2013

(51) Int. Cl.
*F02N 11/08*    (2006.01)
(52) U.S. Cl.
USPC .............. 123/179.4; 123/179.3; 701/113
(58) Field of Classification Search
USPC .............. 123/179.1, 179.3, 179.4, 179.25; 701/113; 74/6, 7 R, 7 A; 290/38 C
See application file for complete search history.

(56) References Cited

U.S. PATENT DOCUMENTS

| | | | |
|---|---|---|---|
| 7,996,135 B2* | 8/2011 | Ishii et al. | 701/54 |
| 8,171,908 B2* | 5/2012 | Senda et al. | 123/179.4 |
| 2007/0295297 A1* | 12/2007 | Tamai et al. | 123/179.4 |
| 2008/0162007 A1* | 7/2008 | Ishii et al. | 701/54 |
| 2010/0050970 A1 | 3/2010 | Okumoto et al. | |
| 2010/0059007 A1* | 3/2010 | Senda et al. | 123/179.4 |
| 2010/0180849 A1* | 7/2010 | Senda et al. | 123/179.4 |
| 2010/0251852 A1* | 10/2010 | Murata et al. | 74/7 A |

FOREIGN PATENT DOCUMENTS

| | | |
|---|---|---|
| EP | 2 159 410 A2 | 3/2010 |
| EP | 2 514 960 A1 | 10/2012 |
| JP | 2001-073911 | 3/2001 |
| JP | 2002-115631 | 4/2002 |
| JP | 2002-285942 | 10/2002 |
| JP | 2005-030348 | 2/2005 |

(Continued)

OTHER PUBLICATIONS

English language Oct. 5, 2010 International Search Report issued in PCT/JP2010/062092.

(Continued)

*Primary Examiner* — Willis R Wolfe, Jr.
*Assistant Examiner* — Anthony L Bacon
(74) *Attorney, Agent, or Firm* — Oliff & Berridge, PLC (57) ABSTRACT

A starter includes a pinion gear that can be engaged with a ring gear provided around an outer circumference of a flywheel or a drive plate of an engine, an actuator for moving the pinion gear to a position of engagement with the ring gear in a driven state, a helical spline for rotating the pinion gear in a reverse direction while the pinion gear moves toward the ring gear, and a motor for rotating the pinion gear. The actuator and the motor are individually controlled. After the actuator was driven and before the motor is driven, drive of the actuator is stopped.

10 Claims, 8 Drawing Sheets

(56) References Cited

FOREIGN PATENT DOCUMENTS

| | | |
|---|---|---|
| JP | 2005-330813 | 12/2005 |
| JP | 2008-163818 | 7/2008 |
| JP | 2009-529114 | 8/2009 |
| JP | A-2010-031851 | 2/2010 |
| JP | 2010-084754 | 4/2010 |
| JP | B2-5056988 | 8/2012 |
| WO | WO 2007/101770 A1 | 9/2007 |

OTHER PUBLICATIONS

English language Oct. 5, 2010 International Search Report issued in PCT/JP2010/062204.

English language Oct. 5, 2010 International Search Report issued in PCT/JP2010/062089.

U.S. Appl. No. 13/144,999 in the name of Kouki Moriya et al., filed Jul. 18, 2011.

* cited by examiner

CONTROL DEVICE AND CONTROL METHOD OF A STARTER, AND ENGINE STARTING DEVICE

DESCRIPTION

1. Technical Field

The present invention relates to a control device and a control method of a starter, and an engine starting device, and particularly to a technique for controlling an actuator that moves a pinion gear to a position of engagement with a ring gear provided around an outer circumference of a flywheel or a drive plate of an engine.

2. Background Art

In recent years, in order to improve fuel efficiency or reduce exhaust emission, some cars having an internal combustion engine such as an engine include what is called an idling-stop function, in which an engine is automatically stopped while a vehicle stops and a driver operates a brake pedal, and the vehicle is automatically re-started, for example, by a driver's operation for re-start such as decrease in an amount of operation of a brake pedal to zero.

In this idling-stop, the engine may be re-started while an engine speed is relatively high. In such a case, with a conventional starter in which pushing-out of a pinion gear for rotating the engine and rotation of the pinion gear are caused by one drive command, the starter is driven after waiting until the engine speed sufficiently lowers, in order to facilitate engagement between the pinion gear and a ring gear of the engine. Then, a time lag is caused between issuance of a request to re-start an engine and actual engine cranking, and the driver may feel uncomfortable.

In order to solve such a problem, Japanese Patent Laying-Open No. 2005-330813 (PTL 1) discloses a technique for causing a pinion gear to perform a rotational operation with the use of a starter configured such that a pinion gear engagement operation and a pinion gear rotational operation can independently be performed prior to the pinion gear engagement operation when a re-start request is issued while rotation of an engine is being lowered immediately after a stop request is generated and for re-starting the engine by causing the pinion gear engagement operation when a pinion gear rotation speed is in synchronization with an engine speed. In addition, Japanese Patent Laying-Open No. 2005-330813 discloses in paragraph 29 the feature that, when the engine is determined as stopped, a pinion is pushed out and thereafter the pinion gear is rotated.

CITATION LIST

Patent Literature

PTL 1: Japanese Patent Laying-Open No. 2005-330813

SUMMARY OF INVENTION

Technical Problem

When the pinion gear is pushed out and thereafter such a state that the pinion gear was pushed out is maintained until the pinion gear is rotated, however, a time period during which electric power is consumed for engaging the pinion and the ring gear with each other can be longer. Consequently, fuel efficiency can finally become poor.

The present invention was made to solve the above-described problems, and an object of the present invention is to improve fuel efficiency.

Solution to Problem

A control device of a starter including a second gear that can be engaged with a first gear coupled to a crankshaft of an engine, an actuator that moves the second gear to a position of engagement with the first gear in a driven state, a helical spline that makes the second gear rotate in a reverse direction while the second gear moves toward the first gear, and a motor that rotates the second gear is capable of individually driving each of the actuator and the motor, and includes drive means for driving the actuator prior to drive of the motor and stop means for stopping drive of the actuator after the actuator was driven and before the motor is driven.

A control method of a starter including a second gear that can be engaged with a first gear coupled to a crankshaft of an engine, an actuator for moving the second gear to a position of engagement with the first gear in a driven state, a helical spline for rotating the second gear in a reverse direction while the second gear moves toward the first gear, and a motor for rotating the second gear, each of the actuator and the motor being able to individually be driven, includes the steps of driving the actuator prior to drive of the motor and stopping drive of the actuator after the actuator was driven and before the motor is driven.

An engine starting device includes a starter including a second gear that can be engaged with a first gear coupled to a crankshaft of an engine, an actuator that moves the second gear to a position of engagement with the first gear in a driven state, a helical spline that makes the second gear rotate in a reverse direction while the second gear moves toward the first gear, and a motor that rotates the second gear, each of the actuator and the motor being able to individually be driven, and a control unit drives the actuator prior to drive of the motor and stops drive of the actuator after the actuator was driven and before the motor is driven.

Advantageous Effects of Invention

Normally, when an engine stops, force in a direction in which a piston is pushed back is applied to the piston in a cylinder in a compression stroke. Consequently, an output shaft of the engine is biased in a reverse direction. Therefore, the second gear engaged with the first gear coupled to the crankshaft is biased in the reverse direction. The second gear is guided by the helical spline such that it moves toward the first gear while rotating in the reverse direction. Therefore, as the second gear is biased in the reverse direction, the second gear is biased in the direction in which it moves toward the first gear. Therefore, the second gear can remain engaged with the first gear without the actuator being driven. Then, after the actuator was driven and before the motor is driven, drive of the actuator is stopped. Thus, a time period during which the actuator is driven can be shortened. Thus, electric power consumed for the second gear and the first gear to remain engaged with each other can be reduced. Consequently, fuel efficiency can be improved.

DESCRIPTION OF EMBODIMENTS

An embodiment of the present invention will be described hereinafter with reference to the drawings. In the description below, the same elements have the same reference characters allotted. Their label and function are also identical. Therefore, detailed description thereof will not be repeated.

Figure 1:
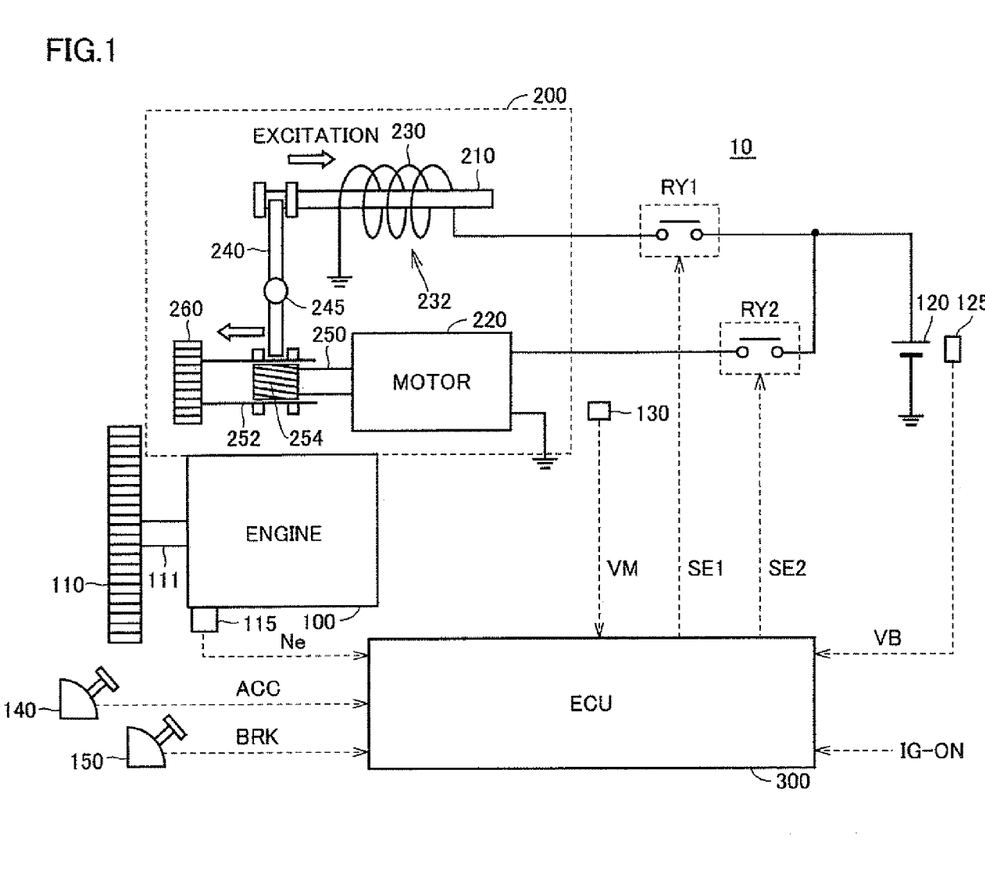
FIG. 1 is an overall block diagram of a vehicle.

Referring to FIG. 1, a vehicle 10 includes an engine 100, a battery 120, a starter 200, an ECU (Electronic Control Unit) 300, and relays RY1, RY2. Starter 200 includes a plunger 210, a motor 220, a solenoid 230, a lever 240, a drive shaft 250, a sleeve 252, and a pinion gear 260.

Engine 100 generates driving force for running vehicle 10. A crankshaft 111 of engine 100 is connected to a drive wheel, with a powertrain structured to include a clutch, a reduction gear, or the like being interposed.

Engine 100 is provided with a rotation speed sensor 115. Rotation speed sensor 115 detects a speed Ne of engine 100 and outputs a detection result to ECU 300. In the present embodiment, engine speed Ne indicates a rotation speed of an output shaft of engine 100 in a forward direction.

Battery 120 is an electric power storage element configured such that it can be charged and can discharge. Battery 120 is configured to include a secondary battery such as a lithium ion battery, a nickel metal hydride battery, a lead-acid battery, or the like. Alternatively, battery 120 may be implemented by a power storage element such as an electric double layer capacitor.

Battery 120 is connected to starter 200 with relays RY1, RY2 controlled by ECU 300 being interposed. Battery 120 supplies a supply voltage for driving to starter 200 as relays RY1, RY2 are closed. It is noted that a negative electrode of battery 120 is connected to a body earth of vehicle 10.

Battery 120 is provided with a voltage sensor 125. Voltage sensor 125 detects an output voltage VB of battery 120 and outputs a detection value to ECU 300.

Relay RY1 has one end connected to a positive electrode of battery 120 and the other end connected to one end of solenoid 230 within starter 200. Relay RY1 is controlled by a control signal SE1 from ECU 300 so as to switch between supply and cut-off of a supply voltage from battery 120 to solenoid 230.

Relay RY2 has one end connected to the positive electrode of battery 120 and the other end connected to motor 220 within starter 200. Relay RY2 is controlled by a control signal SE2 from ECU 300 so as to switch between supply and cut-off of a supply voltage from battery 120 to motor 220. In addition, a voltage sensor 130 is provided in a power line connecting relay RY2 and motor 220 to each other. Voltage sensor 130 detects a motor voltage VM and outputs a detection value to ECU 300.

As described above, supply of a supply voltage to motor 220 and solenoid 230 within starter 200 can independently be controlled by relays RY1, RY2.

Drive shaft 250 is coupled to a rotation shaft of a rotor (not shown) within the motor, for example, with a reduction gear or the like being interposed. Sleeve 252 is provided to be slidable in an axial direction, concentrically with drive shaft 250. Drive shaft 250 and sleeve 252 are engaged with each other, with a helical spline 254 formed on an outer circumferential surface of drive shaft 250 being interposed. Helical spline 254 guides sleeve 252 and pinion gear 260 such that sleeve 252 rotates in a direction reverse to motor 220, that is, a direction reverse to pinion gear 260 while sleeve 252 moves in a direction toward ring gear 110 provided on an outer circumference of a flywheel or a drive plate of engine 100. Namely, helical spline 254 makes pinion gear 260 rotate in a reverse direction while pinion gear 260 moves toward ring gear 110.

Pinion gear 260 is provided on an end portion of sleeve 252 opposite to motor 220. As relay RY2 is closed and the supply voltage is supplied from battery 120 so as to rotate motor 220, a rotational operation of the rotor is transmitted to pinion gear 260 through drive shaft 250 and sleeve 252, to thereby rotate pinion gear 260.

As described above, solenoid 230 has one end connected to relay RY1 and the other end connected to the body earth. As relay RY1 is closed and solenoid 230 is excited, solenoid 230 attracts plunger 210 in a direction of arrow. Namely, plunger 210 and solenoid 230 constitute actuator 232.

Plunger 210 is coupled to sleeve 252 with lever 240 being interposed. As solenoid 230 is excited, plunger 210 is attracted in the direction of the arrow. Thus, lever 240 of which fulcrum 245 is fixed moves sleeve 252 from a stand-by position shown in FIG. 1 in a direction reverse to a direction of operation of plunger 210, that is, a direction in which pinion gear 260 moves away from a main body of motor 220.

As solenoid 230 is excited and sleeve 252 moves in the axial direction toward ring gear 110, pinion gear 260 is engaged with ring gear 110 provided around the outer circumference of the flywheel or the drive plate attached to crankshaft 111 of engine 100. Then, as pinion gear 260 performs a rotational operation while pinion gear 260 and ring gear 110 are engaged with each other, engine 100 is cranked and started.

Thus, in the present embodiment, actuator 232 for moving pinion gear 260 (sleeve 252) to a position of engagement with ring gear 110 provided around the outer circumference of the flywheel or the drive plate of engine 100 and motor 220 for rotating pinion gear 260 are individually controlled.

Force in a direction reverse to the arrow in FIG. 1 is applied to plunger 210 by a not-shown spring, and when solenoid 230 is not excited, plunger 210 returns to the stand-by position.

Figure 2:
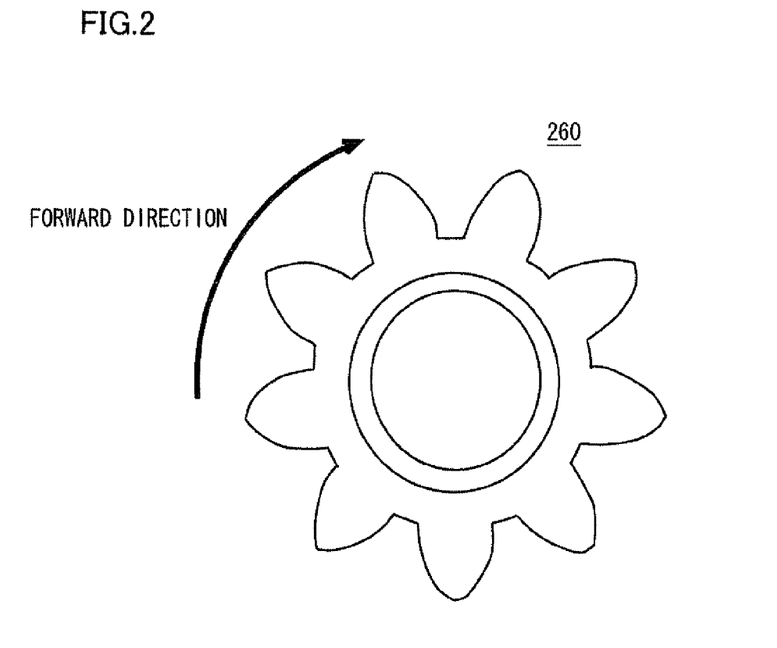
FIG. 2 is a side view of a pinion gear.

As shown in FIG. 2, when pinion gear 260 moves away from ring gear 110, helical spline 254 guides pinion gear 260 such that it rotates in a forward direction. Therefore, friction force between ring gear 110 and pinion gear 260 is reduced. Consequently, disengagement between ring gear 110 and pinion gear 260 is facilitated. It is noted that a one-way clutch may be provided between sleeve 252 and drive shaft 250 such that the rotor of motor 220 does not rotate due to the rotational operation of ring gear 110.

ECU 300 includes a CPU (Central Processing Unit), a storage device, and an input/output buffer, none of which is shown, and receives input from each sensor or provides output of a control command to each piece of equipment. It is noted that such control is not limited to processing by software, and a part thereof may also be constructed by dedicated hardware (electronic circuitry) and processed.

ECU 300 receives a signal ACC indicating an amount of operation of an accelerator pedal 140 from a sensor (not shown) provided on accelerator pedal 140. ECU 300 receives a signal BRK indicating an amount of operation of a brake pedal 150 from a sensor (not shown) provided on brake pedal 150. In addition, ECU 300 receives a start operation signal IG-ON issued in response to a driver's ignition operation or the like. Based on such information, ECU 300 generates a signal requesting start of engine 100 and a signal requesting stop thereof and outputs control signal SE1, SE2 in accordance therewith, so as to control an operation of starter 200.

Figure 3:
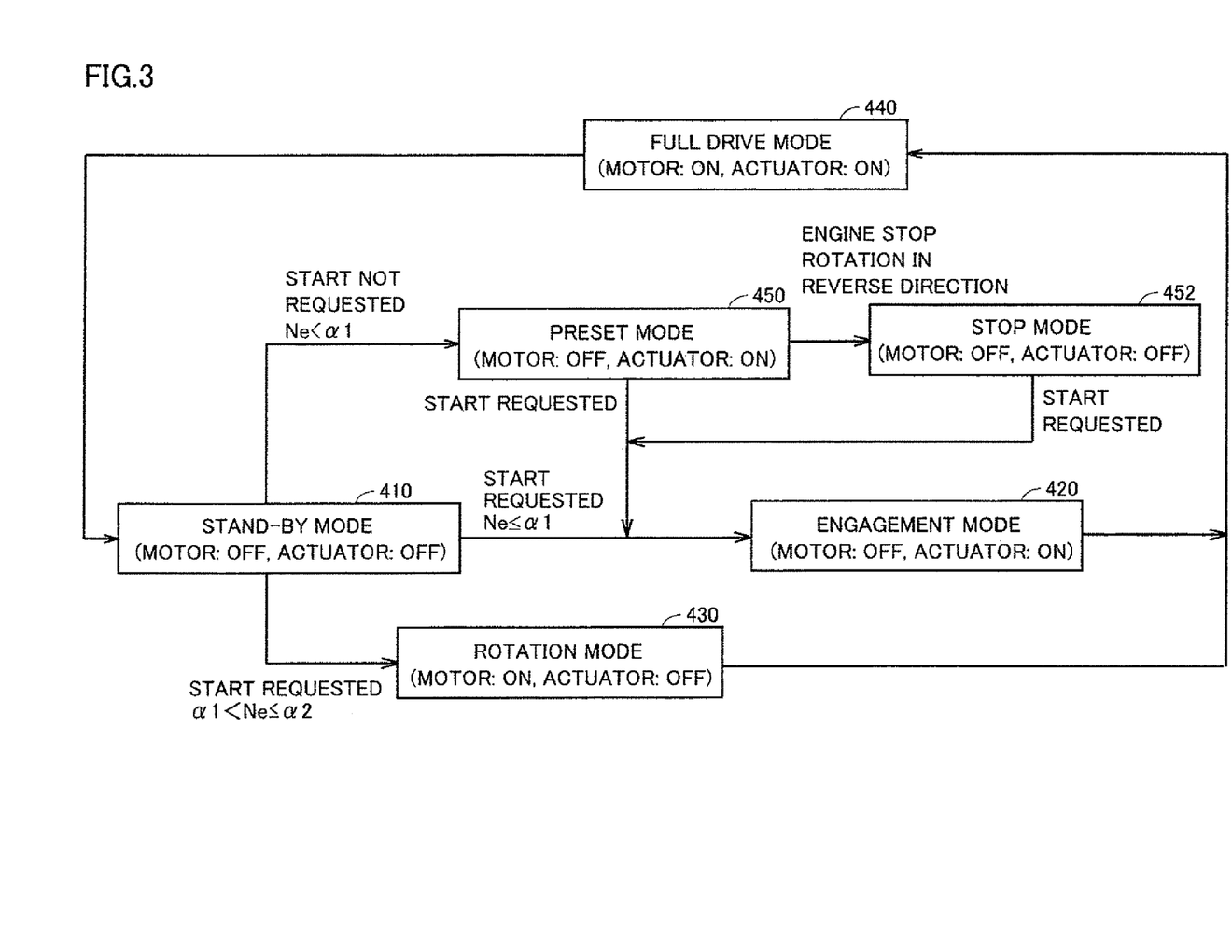
FIG. 3 is a diagram for illustrating transition of an operation mode of a starter.

Transition of an operation mode of starter 200 will be described with reference to FIG. 3. The operation mode of starter 200 in the present embodiment includes a stand-by mode 410, an engagement mode 420, a rotation mode 430, a full drive mode 440, a preset mode 450, and a stop mode 452.

Stand-by mode 410 represents a state in which both of actuator 232 and motor 220 in starter 200 are not driven, that is, a state in which an engine start request to starter 200 is not output. Stand-by mode 410 corresponds to the initial state of starter 200, and it is selected when drive of starter 200 is not necessary, for example, before an operation to start engine 100, after completion of start of engine 100, failure in starting engine 100, and the like.

Full drive mode 440 represents a state in which both of actuator 232 and motor 220 in starter 200 are driven. In this full drive mode 440, motor 220 rotates pinion gear 260 while pinion gear 260 and ring gear 110 are engaged with each other. Thus, engine 100 is actually cranked and the operation for start is started.

As described above, starter 200 in the present embodiment can independently drive each of actuator 232 and motor 220. Therefore, in a process of transition from stand-by mode 410 to full drive mode 440, there are a case where actuator 232 is driven prior to drive of motor 220 (that is, corresponding to engagement mode 420) and a case where motor 220 is driven prior to drive of actuator 232 (that is, corresponding to rotation mode 430).

Selection between these engagement mode 420 and rotation mode 430 is basically made based on speed Ne of engine 100 when re-start of engine 100 is requested.

Engagement mode 420 refers to a state where only actuator 232 is driven and motor 220 is not driven. This mode is selected when pinion gear 260 and ring gear 110 can be engaged with each other even while pinion gear 260 remains stopped. Specifically, while a request to re-start engine 100 is output and engine 100 remains stopped or speed Ne of engine 100 is sufficiently low (Ne≤a first reference value α1), this engagement mode 420 is selected.

Meanwhile, rotation mode 430 refers to a state where only motor 220 is driven and actuator 232 is not driven. This mode is selected, for example, when a request for re-start of engine 100 is output immediately after stop of engine 100 is requested and when speed Ne of engine 100 is relatively high (α1<Ne≤a second reference value α2).

Thus, when speed Ne of engine 100 is high, difference in speed between pinion gear 260 and ring gear 110 is great while pinion gear 260 remains stopped, and engagement between pinion gear 26.0 and ring gear 110 may become difficult. Therefore, in rotation mode 430, only motor 220 is driven prior to drive of actuator 232, so that the rotation speed of ring gear 110 and a rotation speed of pinion gear 260 are in synchronization with each other. Then, in response to difference between the rotation speed of ring gear 110 and the rotation speed of pinion gear 260 being sufficiently small, actuator 232 is driven and ring gear 110 and pinion gear 260 are engaged with each other. Then, the operation mode makes transition from rotation mode 430 to full drive mode 440.

In the case of full drive mode 440, the operation mode returns from full drive mode 440 to stand-by mode 410 in response to completion of start of engine 100 and start of a self-sustained operation of engine 100.

Thus, when a signal requesting start of engine 100 is output, that is, when it is determined that engine 100 is to be started, actuator 232 and motor 220 are controlled in any one mode of a first mode in which transition to full drive mode 440 is made via engagement mode 420 and a second mode in which transition to full drive mode 440 is made via rotation mode 430.

Preset mode 450 refers to a state in which only actuator 232 is driven and motor 220 is not driven. This mode is selected, for example, when a request to re-start engine 100 is not output and speed Ne of engine 100 is sufficiently low (Ne<first reference value α1).

Stop mode 452 refers to a state where drive of actuator 232 is stopped and motor 220 is not driven. In stop mode 452, relay RY1 is opened and feeding electric power to solenoid 230 is stopped. This mode is selected, for example, when a request to re-start engine 100 is not output and when engine 100 stops after crankshaft 111 of engine 100 rotated in a reverse direction.

Therefore, when engine 100 stops without crankshaft 111 of engine 100 rotating in a reverse direction, preset mode 450 is continued.

When a request to re-start engine 100 is output while preset mode 450 or stop mode 452 is selected, the operation mode makes transition to engagement mode 420. Therefore, in making transition from stop mode 452 to engagement mode 420, actuator 232 is driven again.

Figure 4:
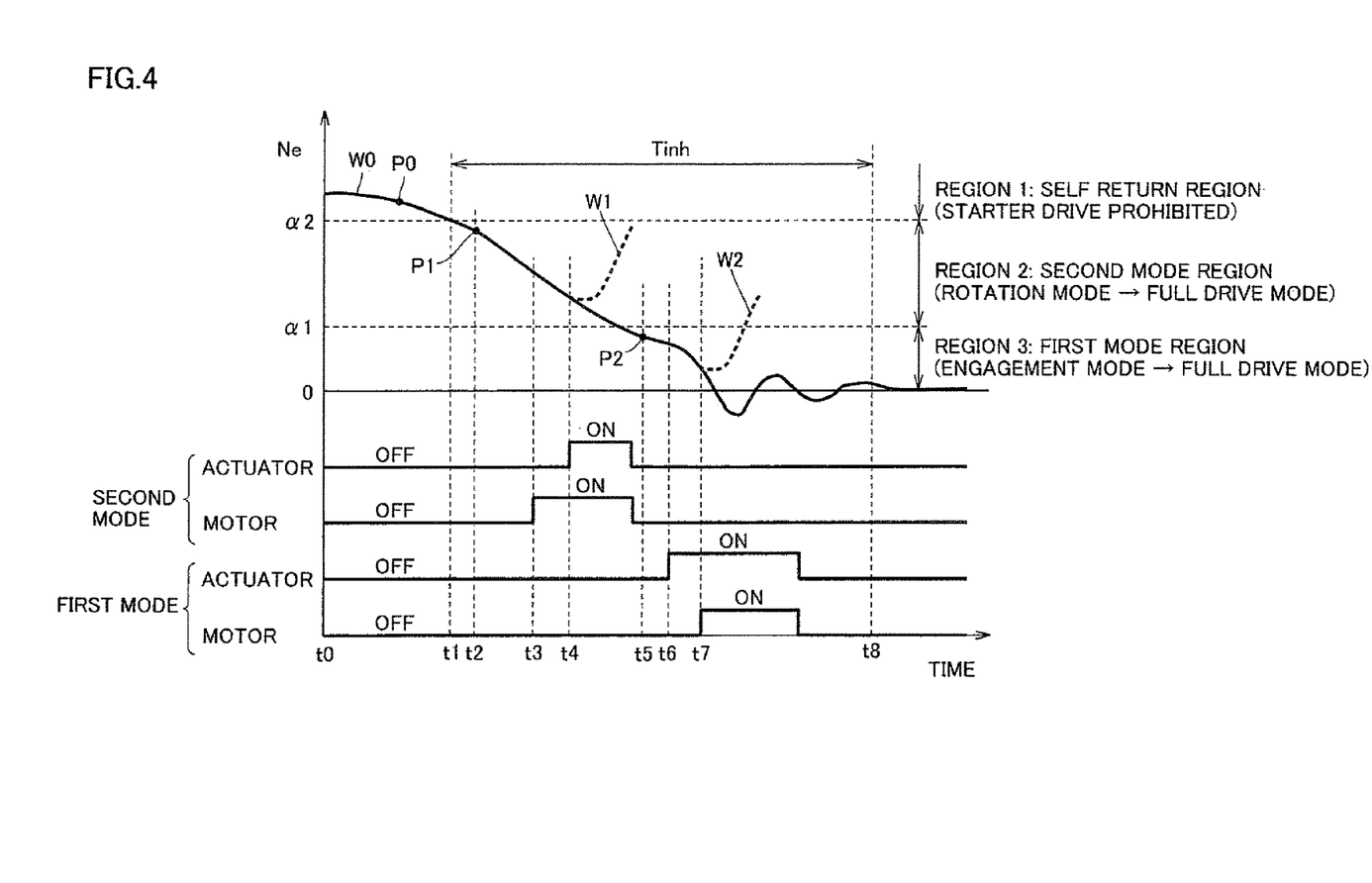
FIG. 4 is a diagram for illustrating an operation mode in an engine start operation.

FIG. 4 is a diagram for illustrating the first mode and the second mode at the time of an engine start operation. As described above, the first mode means a mode in which transition to full drive mode 440 is made via engagement mode 420. The second mode means a mode in which transition to full drive mode 440 is made via rotation mode 430.

In FIG. 4, the abscissa indicates time and the ordinate indicates speed Ne of engine 100 and a state of drive of actuator 232 and motor 220 in the first mode and the second mode.

A case where, at a time t0, for example, a condition that the vehicle stops and the driver operates brake pedal 150 is satisfied and consequently a request to stop engine 100 is generated and combustion in engine 100 is stopped is considered. Here, unless engine 100 is re-started, speed Ne of engine 100 gradually lowers as shown with a solid curve W0 and finally rotation of engine 100 stops.

Then, a case where, for example, an amount of the driver's operation of brake pedal 150 attains to zero while speed Ne of engine 100 is lowering, and thus a request to re-start engine 100 is generated is considered. Here, categorization into three regions based on speed Ne of engine 100 is made.

A first region (region 1) refers to a case where speed Ne of engine 100 is higher than second reference value α2, and for example, such a state that a request for re-start is generated at a point P0 in FIG. 4.

This region 1 is a region where engine 100 starts by a fuel injection and ignition operation without using starter 200 because speed Ne of engine 100 is sufficiently high. Namely, it is a region where engine 100 can return by itself. Therefore, in region 1, drive of starter 200 is prohibited. It is noted that second reference value α2 described above may be restricted depending on a maximum rotation speed of motor 220.

A second region (region 2) refers to a case where speed Ne of engine 100 is located between first reference value α1 and second reference value α2, and such a state that a request for re-start is generated at a point P1 in FIG. 4.

This region 2 is a region where speed Ne of engine 100 is relatively high, although engine 100 cannot return by itself. In this region, the rotation mode is selected as described with reference to FIG. 3.

When a request to re-start engine 100 is generated at a time t2, motor 220 is driven at a time t3. Thus, pinion gear 260 starts to rotate. Then, at a time t4, actuator 232 is driven. Then, when ring gear 110 and pinion gear 260 are engaged with each other, engine 100 is cranked and speed Ne of engine 100 increases as shown with a dashed curve W1. Thereafter, when engine 100 resumes the self-sustained operation, drive of actuator 232 and motor 220 is stopped.

A third region (region 3) refers to a case where speed Ne of engine 100 is lower than first reference value $\alpha 1$, and for example, such a state that a request for re-start is generated at a point P2 in FIG. 4.

This region 3 is a region where speed Ne of engine 100 is low and pinion gear 260 and ring gear 110 can be engaged with each other without synchronizing pinion gear 260. In this region, the engagement mode is selected as described with reference to FIG. 3.

When a request to re-start engine 100 is generated at a time t5, actuator 232 is driven at a time t6. Thus, pinion gear 260 is pushed toward ring gear 110. Thereafter, motor 220 is driven (at a time t7 in FIG. 4). Thus, engine 100 is cranked and speed Ne of engine 100 increases as shown with a dashed curve W2. Thereafter, when engine 100 resumes the self-sustained operation, drive of actuator 232 and motor 220 is stopped.

By thus controlling re-start of engine 100 by using starter 200 capable of independently driving actuator 232 and motor 220, engine 100 can be re-started in a shorter period of time than in a case of a conventional starter where an operation to re-start engine 100 was prohibited during a period (Tinh) from a speed at which return of engine 100 by itself was impossible (time t1 in FIG. 4) to stop of engine 100 (a time t8 in FIG. 4). Namely, in the present embodiment, while engine speed Ne is greater than zero, actuator 232 is actuated such that pinion gear 260 moves toward ring gear 100, and pinion gear 260 can be engaged with ring gear 100 before engine speed Ne attains to zero. Cranking can thus be started. Thus, the driver's uncomfortable feeling due to delayed re-start of the engine can be lessened.

Figure 5:
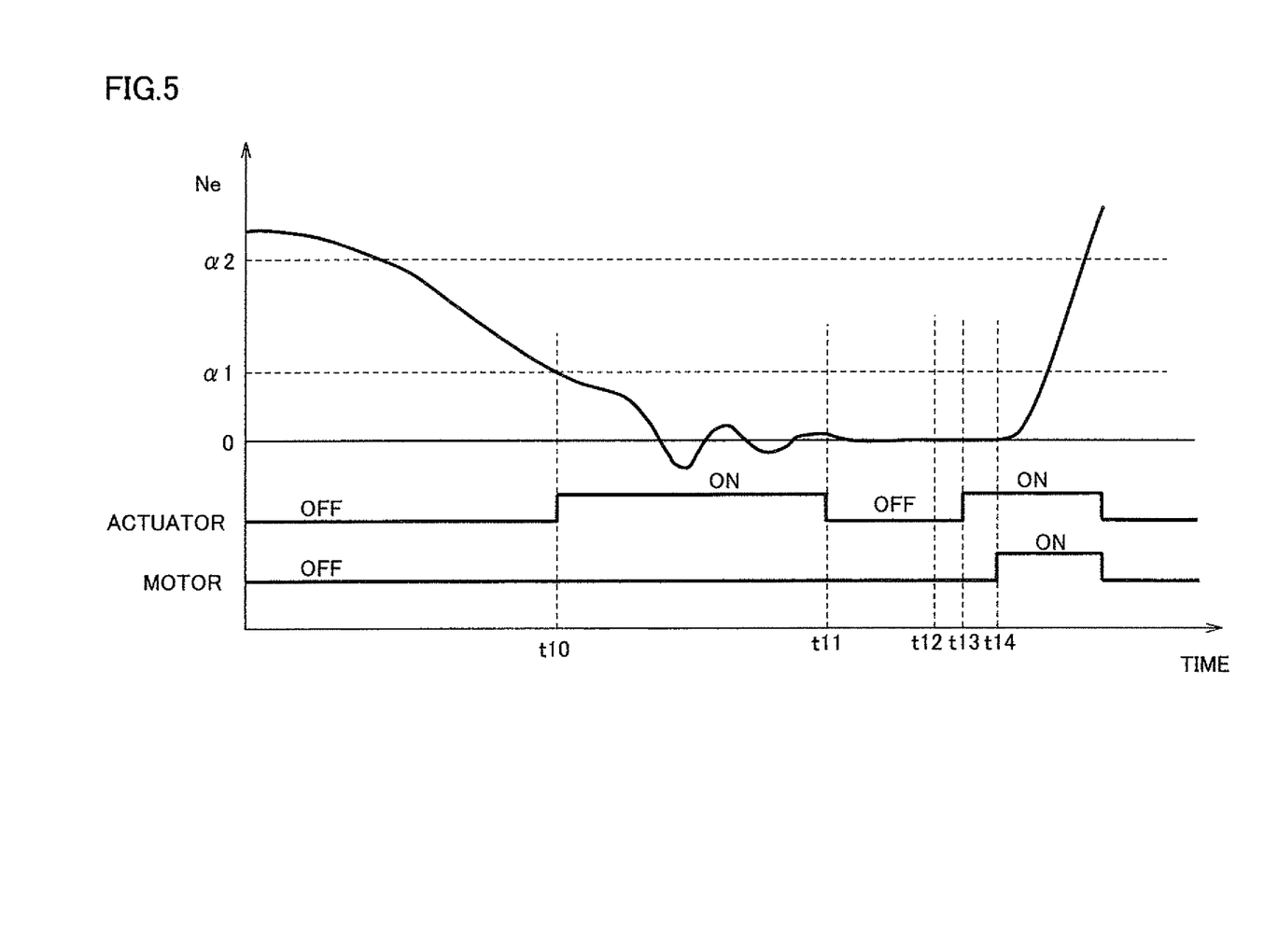
FIG. 5 is a diagram for illustrating an operation mode when a crankshaft rotates in a reverse direction in a process until the engine stops.

Referring to FIG. 5, a case where speed Ne of engine 100 becomes lower than first reference value $\alpha 1$ at a time t10 without a request to re-start engine 100 being output is assumed. In this case, the preset mode described previously is selected. Therefore, actuator 232 is driven. Thus, pinion gear 260 is pushed toward ring gear 110. Therefore, pinion gear 260 is engaged with ring gear 110.

Thereafter, when engine 100 stops, force in a direction pushing back the piston is applied to the piston in a cylinder in the compression stroke. Consequently, crankshaft 111 is biased in the reverse direction. Therefore, when engine 100 stops after crankshaft 111 of engine 100 rotated in the reverse direction, that is, after a speed of engine 100 attained to a negative value, pinion gear 260 engaged with ring gear 110 is biased in the reverse direction.

As described previously, pinion gear 260 is guided by helical spline 254 such that it moves toward ring gear 110 while rotating in the reverse direction. Therefore, as pinion gear 260 is biased in the reverse direction, pinion gear 260 is biased in a direction in which it moves toward ring gear 110. Therefore, pinion gear 260 can remain engaged with ring gear 110 without actuator 232 being driven.

Then, when it is determined that engine 100 has stopped at a time t11 and rotation in the reverse direction of crankshaft 111 of engine 100 is detected in the process until engine 100 stops, the stop mode is selected. Therefore, feeding electric power to solenoid 230 is stopped and drive of actuator 232 is stopped before motor 220 is driven. A time period during which actuator 232 is driven can thus be shortened. Therefore, electric power consumed for causing pinion gear 260 and ring gear 110 to remain engaged with each other can be reduced. Consequently, fuel efficiency can be improved.

When a request to start engine 100 is output at a time t12, the operation mode makes transition from the stop mode to the engagement mode at a time t13. Therefore, actuator 232 is driven again. Thereafter, motor 220 is driven (a time t14 in FIG. 5).

Figure 6:
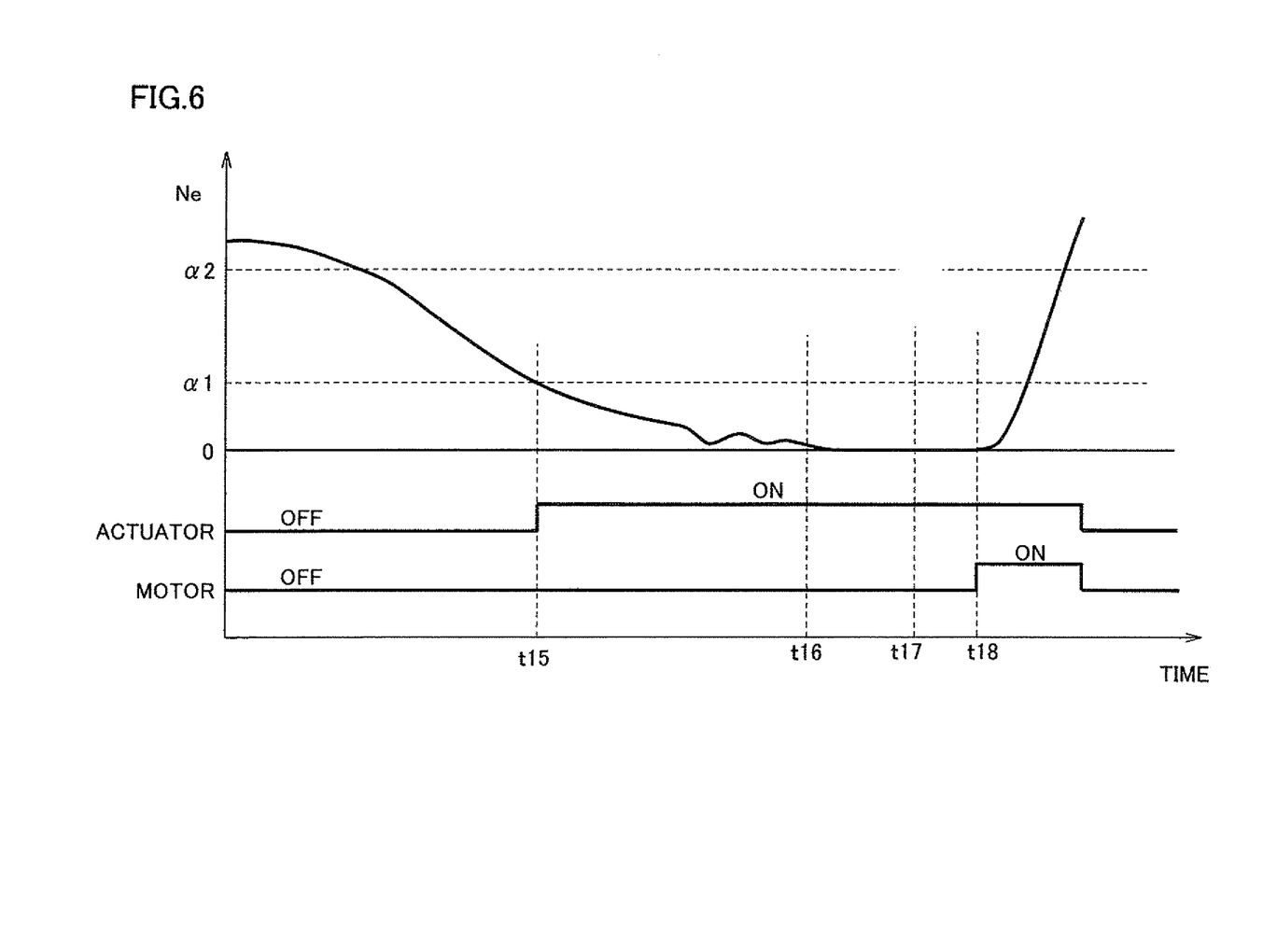
FIG. 6 is a diagram for illustrating an operation mode when a crankshaft does not rotate in a reverse direction in a process until the engine stops.

Meanwhile, as shown in FIG. 6, in a case where speed Ne of engine 100 becomes lower than first reference value $\alpha 1$ at a time t15 and engine 100 does not rotate in the reverse direction after actuator 232 was driven, it is not always the case that pinion gear 260 is biased in the reverse direction. If actuator 232 is stopped in this case, pinion gear 260 may move away from ring gear 110. Therefore, even when it is determined at a time t16 that engine 100 has stopped, drive of actuator 232 is continued. Thereafter, when a request to start engine 100 is output at a time t17, motor 220 is driven at a time t18.

Figure 7:
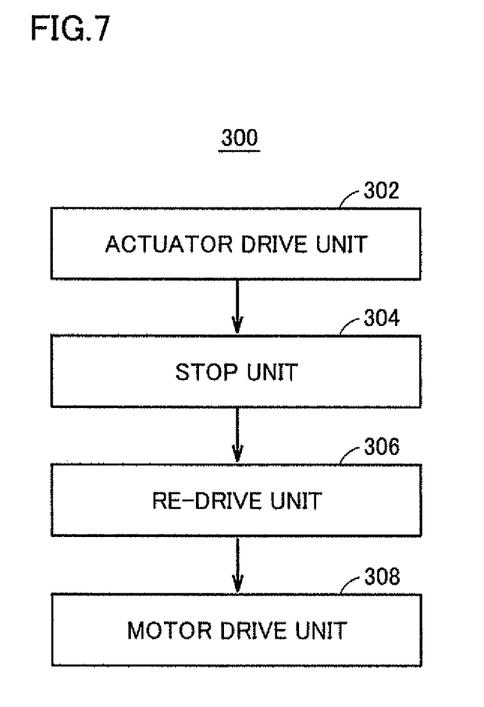
FIG. 7 is a functional block diagram of an ECU.

Referring to FIG. 7, a function of ECU 300 will be described. It is noted that a function of ECU 300 described below may be implemented by software or hardware or by cooperation of software and hardware.

ECU 300 includes an actuator drive unit 302, a stop unit 304, a re-drive unit 306, and a motor drive unit 308.

Actuator drive unit 302 drives actuator 232 such that pinion gear 260 moves toward ring gear 110. Actuator drive unit 302 drives actuator 232 such that pinion gear 260 moves toward ring gear 110 when speed Ne of engine 100 is lower than first reference value $\alpha 1$.

Stop unit 304 stops drive of actuator 232 after actuator 232 was driven and before motor 220 is driven. Stop unit 304 stops drive of actuator 232 when crankshaft 111 of engine 100 rotates in the reverse direction.

Re-drive unit 306 drives actuator 232 again after drive of actuator 232 was stopped.

Motor drive unit 308 drives motor 220 such that pinion gear 260 rotates, after actuator 232 was driven again.

Figure 8:
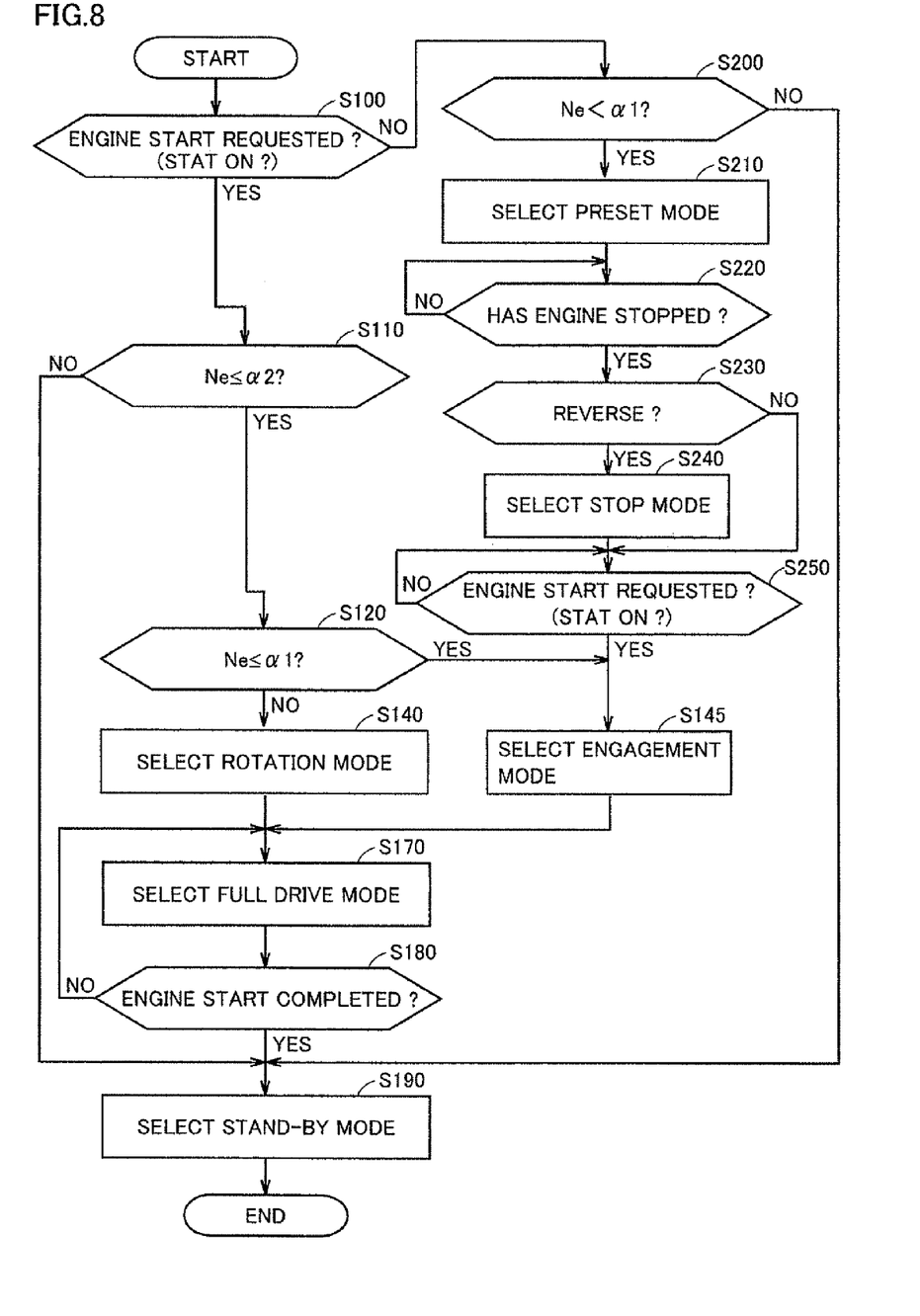
FIG. 8 is a flowchart showing a control structure of processing performed by the ECU.

FIG. 8 is a flowchart for illustrating details of operation mode setting control processing performed by ECU 300 in the present embodiment. The flowchart shown in FIG. 8 is realized by executing a program stored in advance in ECU 300 in a prescribed cycle. Alternatively, regarding some steps, processing can also be performed by constructing dedicated hardware (electronic circuitry).

In step (hereinafter the step being abbreviated as S) 100, ECU 300 determines whether start of engine 100 has been requested or not. Namely, whether to start engine 100 or not is determined.

When start of engine 100 has been requested (YES in S100), the process proceeds to S110 and ECU 300 then determines whether or not speed Ne of engine 100 is equal to or smaller than second reference value $\alpha 2$.

When speed Ne of engine 100 is greater than second reference value $\alpha 2$ (NO in S110), this case corresponds to region 1 in FIG. 4 where engine 100 can return by itself. Therefore, ECU 300 causes the process to proceed to S190 and selects the stand-by mode.

When speed Ne of engine 100 is equal to or smaller than second reference value $\alpha 2$ (YES in S110), ECU 300 further determines whether or not speed Ne of engine 100 is equal to or smaller than first reference value $\alpha 1$.

When speed Ne of engine 100 is equal to or smaller than first reference value α1 (YES in S120), this case corresponds to region 1 in FIG. 4. Therefore, the process proceeds to S145 and ECU 300 selects the engagement mode. Then, ECU 300 outputs control signal SE1 so as to close relay RY1, and thus actuator 232 is driven. Here, motor 220 is not driven.

Thereafter, the process proceeds to S170 and ECU 300 selects the full drive mode. Then, starter 200 starts cranking of engine 100.

Then, in S180, ECU 300 determines whether start of engine 100 has been completed or not. Determination of completion of start of engine 100 may be made, for example, based on whether or not the engine speed is greater than a threshold value γ indicating the self-sustained operation after lapse of a prescribed period since start of drive of motor 220.

When start of engine 100 has not been completed (NO in S180), the process returns to S170 and cranking of engine 100 is continued.

When start of engine 100 has been completed (YES in S180), the process proceeds to S190 and ECU 300 selects the stand-by mode.

On the other hand, when speed Ne of engine 100 is greater than first reference value α1 (NO in S120), the process proceeds to S140 and ECU 300 selects the rotation mode. Then, ECU 300 outputs control signal SE2 so as to close relay RY2, and thus motor 220 is driven. Here, actuator 232 is not driven.

Then, ECU 300 selects the full drive mode in S170. Thus, actuator 232 is driven, pinion gear 260 and ring gear 110 are engaged with each other, and engine 100 is cranked.

When a request to start engine 100 has not been made (NO in S100), the process proceeds to S200, and ECU 300 determines whether speed Ne of engine 100 is lower than first reference value α1 or not.

When speed Ne of engine 100 is not lower than first reference value α1 (NO in S200), the process proceeds to S190 and ECU 300 selects the stand-by mode.

When speed Ne of engine 100 is lower than first reference value α1 (YES in S200), the process proceeds to S210 and ECU 300 selects the preset mode. Then, ECU 300 outputs control signal SE1 to close relay RY1, to thereby drive actuator 232. Here, motor 220 is not driven.

Thereafter, the process proceeds to S220 and ECU 300 determines whether engine 100 has stopped or not. Namely, whether speed Ne of engine 100 is zero or not is determined. When engine 100 has stopped (YES in S220), the process proceeds to S230 and ECU 300 determines whether crankshaft 111 has rotated in the reverse direction or not in the process until engine 100 stops.

When crankshaft 111 has rotated in the reverse direction (YES in S230), the process proceeds to S240 and ECU 300 selects the stop mode. Therefore, feeding electric power to solenoid 230 is stopped and drive of actuator 232 is stopped. Thereafter, the process proceeds to S250.

When crankshaft 111 has not rotated in the reverse direction (NO in S230), the process skips S240 and proceeds to S250, and ECU 300 determines again whether a request to start engine 100 has been made or not.

When a request to start engine 100 has been made (YES in S250), the process proceeds to S145 and ECU 300 selects the engagement mode. Therefore, ECU 300 outputs control signal SE1 to close relay RY1, to thereby drive actuator 232. Therefore, when feeding electric power to actuator 232 has been stopped, actuator 232 is driven again. Here, motor 220 is not driven.

Then, ECU 300 selects the full drive mode in S170. Thus, actuator 232 is driven, pinion gear 260 and ring gear 110 are engaged with each other, and engine 100 is cranked.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 10 vehicle; 100 engine; 110 ring gear; 111 crankshaft; 112 tooth surface; 114 side end portion; 115 rotation speed sensor; 116 beveled portion; 120 battery; 125, 130 voltage sensor; 140 accelerator pedal; 150 brake pedal; 160 powertrain; 170 drive wheel; 200 starter; 210 plunger; 220 motor; 230 solenoid; 232 actuator; 240 lever; 245 fulcrum; 250 drive shaft; 252 sleeve; 254 helical spline; 260 pinion gear; 300 ECU; 302 actuator drive unit; 304 stop unit; 306 re-drive unit; 308 motor drive unit; 410 stand-by mode; 420 engagement mode; 430 rotation mode; 440 full drive mode; 450 preset mode; 452 stop mode; and RY1, RY2 relay.

The invention claimed is:

1. A control device of a starter that includes a second gear that can be engaged with a first gear coupled to a crankshaft of an engine, an actuator that moves said second gear to a position of engagement with said first gear in a driven state, a helical spline that makes said second gear rotate in a reverse direction while said second gear moves toward said first gear, and a motor that rotates said second gear, said control device being capable of individually driving each of said actuator and said motor, comprising:

drive means for driving said actuator prior to drive of said motor; and stop means for stopping drive of said actuator when an output shaft of said engine rotates in a reverse direction, after said actuator was driven and before said motor is driven.

2. The control device according to claim 1, further comprising means for continuing to drive said actuator when said output shaft of said engine does not rotate in the reverse direction, after said actuator was driven and before said motor is driven.

3. The control device according to claim 1, further comprising:

means for driving again said actuator after drive of said actuator was stopped; and means for driving said motor after said actuator was driven again.

4. The control device according to claim 1, wherein said drive means drives said actuator prior to drive of said motor when a rotation speed of an output shaft of said engine in a forward direction is lower than a predetermined rotation speed.

5. A control method of a starter that includes a second gear that can be engaged with a first gear coupled to a crankshaft of an engine, an actuator that moves said second gear to a position of engagement with said first gear in a driven state, a helical spline that makes said second gear rotate in a reverse direction while said second gear moves toward said first gear, and a motor that rotates said second gear, each of said actuator and said motor being able to individually be driven, comprising the steps of:

driving said actuator prior to drive of said motor; and stopping drive of said actuator when an output shaft of said engine rotates in a reverse direction, after said actuator was driven and before said motor is driven.

6. The control method according to claim 5, further comprising the step of continuing to drive said actuator when said output shaft of said engine does not rotate in the reverse direction, after said actuator was driven and before said motor is driven.

7. The control method according to claim 5, further comprising the steps of:
- driving again said actuator after drive of said actuator was stopped; and
- driving said motor after said actuator was driven again.

8. The control method according to claim 5, wherein
said step of driving said actuator includes the step of driving said actuator prior to drive of said motor when a rotation speed of an output shaft of said engine in a forward direction is lower than a predetermined rotation speed.

9. An engine starting device, comprising:
- a starter that includes a second gear that can be engaged with a first gear coupled to a crankshaft of an engine, an actuator that moves said second gear to a position of engagement with said first gear in a driven state, a helical spline that makes said second gear rotate in a reverse direction while said second gear moves toward said first gear, and a motor that rotates said second gear, each of said actuator and said motor being able to individually be driven; and
- a control unit that drives said actuator prior to drive of said motor and stops drive of said actuator when an output shaft of said engine rotates in a reverse direction, after said actuator was driven and before said motor is driven.

10. The engine starting device according to claim 9, wherein
said control unit continues to drive said actuator when said output shaft of said engine does not rotate in the reverse direction, after said actuator was driven and before said motor is driven.

* * * * *